United States Patent
Raghavan et al.

(10) Patent No.: US 11,240,766 B2
(45) Date of Patent: Feb. 1, 2022

(54) MITIGATION OF MAXIMUM PERMISSIBLE EXPOSURE (MPE) CONSTRAINT BASED ON USER EQUIPMENT (UE) FEEDBACKS

(71) Applicant: QUALCOMM Incorporated, San Diego, CA (US)

(72) Inventors: Vasanthan Raghavan, West Windsor Township, NJ (US); Sundar Subramanian, San Diego, CA (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 16/256,603

(22) Filed: Jan. 24, 2019

(65) Prior Publication Data

US 2019/0261289 A1    Aug. 22, 2019

Related U.S. Application Data

(60) Provisional application No. 62/710,421, filed on Feb. 16, 2018.

(51) Int. Cl.
*H04W 52/36* (2009.01)
*H04W 52/14* (2009.01)
(Continued)

(52) U.S. Cl.
CPC ......... *H04W 52/367* (2013.01); *H04L 5/0053* (2013.01); *H04W 52/146* (2013.01);
(Continued)

(58) Field of Classification Search
None
See application file for complete search history.

(56) References Cited

U.S. PATENT DOCUMENTS

| 10,076,228 B1* | 9/2018 | Gitlin | A61B 5/07 |
| 2006/0062379 A1* | 3/2006 | Sedarat | H04B 3/23 |
| | | | 379/406.01 |

(Continued)

FOREIGN PATENT DOCUMENTS

| CN | 102655673 A | 9/2012 | |
| CN | 106998341 A * | 8/2017 | H04L 29/08 |

(Continued)

OTHER PUBLICATIONS

International Search Report and Written Opinion—PCT/US2019/015214—ISA/EPO—dated Apr. 5, 2019.

*Primary Examiner* — Mohammed Rachedine
(74) *Attorney, Agent, or Firm* — Haynes and Boone, LLP

(57) ABSTRACT

Wireless communications systems and methods related to mitigating maximum permissible exposure (MPE) constraints based on user equipment (UE) feedback are provided. A first wireless communication device transmits, to a second wireless communication device, a plurality of reports, each report indicating an allowable transmission power level at the first wireless communication device satisfying an MPE parameter. The first wireless communication device receives, from the second wireless communication device, a first configuration based on an MPE profile associated with the first wireless communication device in response to the plurality of reports. The first wireless communication device transmits, to the second wireless communication device, a first communication signal over a first beam based on the first configuration.

64 Claims, 9 Drawing Sheets

(51) Int. Cl.
  *H04W 52/38*    (2009.01)
  *H04W 52/22*    (2009.01)
  *H04W 72/04*    (2009.01)
  *H04B 7/0408*   (2017.01)
  *H04B 7/06*     (2006.01)
  *H04L 5/00*     (2006.01)
  *H04W 24/10*    (2009.01)

(52) U.S. Cl.
  CPC ....... *H04W 52/225* (2013.01); *H04W 52/386* (2013.01); *H04W 72/046* (2013.01); *H04W 72/0473* (2013.01); *H04B 7/0408* (2013.01); *H04B 7/0617* (2013.01); *H04B 7/0639* (2013.01); *H04L 5/0091* (2013.01); *H04W 24/10* (2013.01)

(56) References Cited

U.S. PATENT DOCUMENTS

| | | | |
|---|---|---|---|
| 2008/0219343 A1 * | 9/2008 | Wu | H04L 25/0228 375/232 |
| 2017/0118686 A1 * | 4/2017 | Fang | H04W 36/00835 |
| 2017/0230869 A1 | 8/2017 | Kubota et al. | |

FOREIGN PATENT DOCUMENTS

| | | | | |
|---|---|---|---|---|
| EP | 2670054 A1 | 12/2013 | | |
| WO | 2012061582 A1 | 5/2012 | | |
| WO | WO-2012143936 A1 * | 10/2012 | ............. | H01Q 1/242 |
| WO | WO-2014055294 A1 * | 4/2014 | ........... | H04B 7/0617 |
| WO | 2018111844 A1 | 6/2018 | | |

\* cited by examiner

MITIGATION OF MAXIMUM PERMISSIBLE EXPOSURE (MPE) CONSTRAINT BASED ON USER EQUIPMENT (UE) FEEDBACKS

CROSS REFERENCE TO RELATED APPLICATIONS

The present application claims priority to and the benefit of the U.S. Provisional Patent Application No. 62/710,421, filed Feb. 16, 2018, which is hereby incorporated by reference in its entirety as if fully set forth below and for all applicable purposes.

TECHNICAL FIELD

The technology discussed in this disclosure relates generally to wireless communication systems and methods, and more particularly to mitigating maximum permissible exposure (MPE) constraints for millimeter wave (mmWave) transmissions with network assistance. Certain embodiments can enable and provide improved communication techniques for a base station (BS) to collect histories or statistics of UL transmission power information from user equipment devices (UEs) and to determine UL transmission configurations for the UEs based on the collected histories or statistics.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. One technique for expanding connectivity may be to extend the frequency operation range to higher frequencies since lower frequencies are becoming over-crowded. For example, mmWave frequency bands between about 30 gigahertz (GHz) to about 300 GHz can provide a large bandwidth for high data rate communications. However, the mmWave frequency bands may have a higher path-loss compared to the lower frequency bands used by conventional wireless communication systems.

To overcome the higher path-loss, BSs and UEs may use beamforming to form directional links for communications. Practical application of beamforming in mmWave systems needs to overcome a number of constraints from regulatory perspectives. For example, Federal Communications Commission (FCC) and International Commission on Non-Ionizing Radiation Protection (ICNIRP), as well as multiple other regulatory agencies across disparate geographies impose MPE constraints on transmitters at various carrier frequencies. MPE constraints are typically specified in terms of short-term temporal averaging of radiated power, medium-term temporal averaging of radiated power, local-spatial averaging of radiated power, and/or medium-spatial averaging of radiated power. The imposing of the MPE constraints can prevent hazardous operating conditions, ensure users' optimal health, and/or reduce electromagnetic pollution or noise/interference from mmWave transmissions.

In certain mmWave systems, a UE may determine and conform to MPE constraints autonomously or locally at the UE. For example, the UE may detect a distance from an antenna or an antenna array of the UE to a user's body part (e.g., a hand, face, ankle, etc.), determine an MPE constraint based on the detected distance, and transmit using an MPE compliant UL power based on the detected distance. However, the autonomous or local detections and UL power adjustments at the UE may not provide optimal performance.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes transmitting, by a first wireless communication device to a second wireless communication device, a plurality of reports, each report indicating an allowable transmission power level at the first wireless communication device satisfying a maximum permissible exposure (MPE) parameter; receiving, by the first wireless communication device from the second wireless communication device, a first configuration based on an MPE profile associated with the first wireless communication device in response to the plurality of reports; and transmitting, by the first wireless communication device to the second wireless communication device, a first communication signal over a first beam based on the first configuration.

In an additional aspect of the disclosure, a method of wireless communication includes receiving, by a first wireless communication device from a second wireless communication device, a plurality of reports, each report indicating an allowable transmission power level at the second wireless communication device satisfying a maximum permissible exposure (MPE) parameter; transmitting, by the first wireless communication device to the second wireless communication device, a first configuration based on an MPE profile associated with the second wireless communication device in response to the plurality of reports; and receiving, by the first wireless communication device from the second wireless communication device, a first communication signal over a first beam based on the first configuration.

In an additional aspect of the disclosure, an apparatus includes a transceiver configured to transmit, to a second wireless communication device, a plurality of reports, each report indicating an allowable transmission power level at the apparatus satisfying a maximum permissible exposure (MPE) parameter; receive, from the second wireless communication device, a first configuration based on an MPE profile associated with the apparatus in response to the plurality of reports; and transmit, to the second wireless communication device, a first communication signal over a first beam based on the first configuration.

In an additional aspect of the disclosure, an apparatus includes a transceiver configured to receive, from a second wireless communication device, a plurality of reports, each report indicating an allowable transmission power level at the second wireless communication device satisfying a maximum permissible exposure (MPE) parameter; transmit, to the second wireless communication device, a first configuration based on an MPE profile associated with the second wireless communication device in response to the plurality of reports; and receive, from the second wireless communication device, a first communication signal over a first beam based on the first configuration.

In an additional aspect of the disclosure, a computer-readable medium having program code recorded thereon, the program code includes code for causing a first wireless communication device to transmit, to a second wireless communication device, a plurality of reports, each report indicating an allowable transmission power level at the first wireless communication device satisfying a maximum permissible exposure (MPE) parameter; code for causing the first wireless communication device to receive, from the second wireless communication device, a first configuration based on an MPE profile associated with the first wireless communication device in response to the plurality of reports; and code for causing the first wireless communication device to transmit, to the second wireless communication device, a first communication signal over a first beam based on the first configuration.

In an additional aspect of the disclosure, a computer-readable medium having program code recorded thereon, the program code includes code for causing a first wireless communication device to receiving, from a second wireless communication device, a plurality of reports, each report indicating an allowable transmission power level at the second wireless communication device satisfying a maximum permissible exposure (MPE) parameter; code for causing the first wireless communication device to transmit, to the second wireless communication device, a first configuration based on an MPE profile associated with the second wireless communication device in response to the plurality of reports; and code for causing the first wireless communication device to receive, from the second wireless communication device, a first communication signal over a first beam based on the first configuration.

In an additional aspect of the disclosure, an apparatus includes means for transmitting, to a second wireless communication device, a plurality of reports, each report indicating an allowable transmission power level at the apparatus satisfying a maximum permissible exposure (MPE) parameter; means for receiving, from the second wireless communication device, a first configuration based on an MPE profile associated with the apparatus in response to the plurality of reports; and means for transmitting, to the second wireless communication device, a first communication signal over a first beam based on the first configuration.

In an additional aspect of the disclosure, an apparatus includes means for receiving, from a second wireless communication device, a plurality of reports, each report indicating an allowable transmission power level at the second wireless communication device satisfying a maximum permissible exposure (MPE) parameter; means for transmitting, to the second wireless communication device, a first configuration based on an MPE profile associated with the second wireless communication device in response to the plurality of reports; and means for receiving, from the second wireless communication device, a first communication signal over a first beam based on the first configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
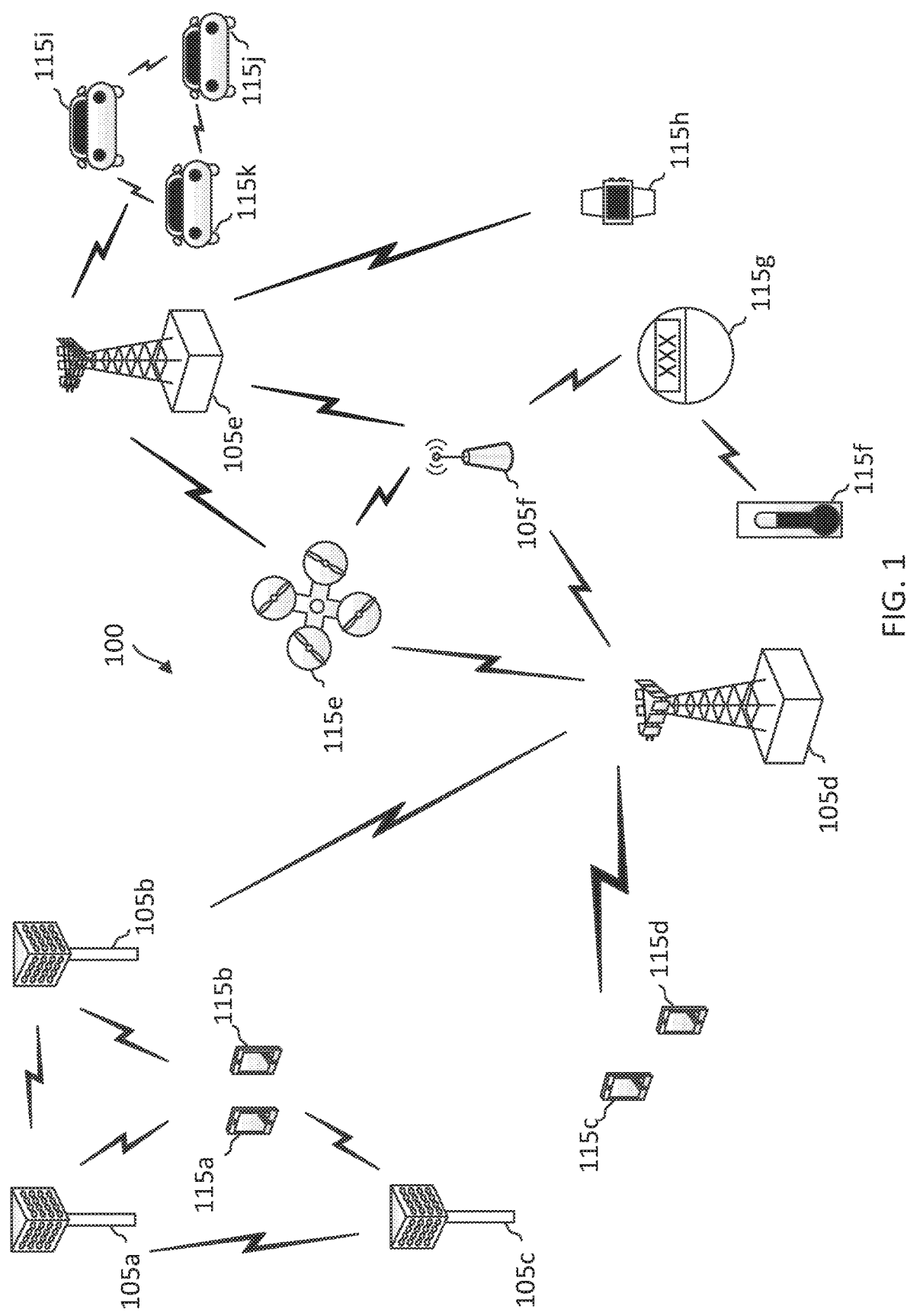
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for mitigating MPE constraints based on UE feedback. For example, a UE may determine maximum allowable UL transmission power levels satisfying MPE constraints at various time instants and report the maximum allowable UL transmission powers to a BS. The BS may track and determine an MPE profile specific to the UE based on the maximum allowable UL transmission powers collected from the UE. The MPE profile provides a long-term view or statistics of the UE's UL transmission powers. The BS may determine a UL transmission configuration for the UE based on the long-term statistics thus accumulated. The UL transmission configuration can include at least one of a beam index, a UL transmission power parameter, or a resource allocation assigned to the UE. Upon receiving the UL transmission configuration, the UE can generate a directional beam based on the beam index and transmit a UL communication signal using the directional beam. The UE may configure the transmission power based on the UL transmission power parameter. The UE may transmit the UL communication signal using resources indicated in the allocation.

In some embodiments, the UE may monitor for an instantaneous MPE violation. Upon detecting an instantaneous MPE violation, the UE may report the instantaneous MPE violation to the BS. In response, the BS may average out instantaneous MPE violations in time and/or in space to meet MPE constraints over a period of time and update a subsequent UL transmission configuration accordingly.

In some embodiments, the UE may report the maximum allowable UL transmission powers to multiple BSs (e.g., a serving BS and one or more neighboring BSs). The BSs may coordinate with each other to determine a device-specific MPE profile for the UE based on the maximum allowable UL transmission powers reports and/or a network-level device-specific MPE profile based on maximum allowable UL transmission powers reports collected from multiple UEs. The BSs may coordinate with each other to determine UL transmission configurations for the UE based on the device-specific MPE profile and/or the network-level device-specific MPE profile.

Aspects of the present application can provide several benefits. For example, the UE feedback of the maximum allowable UL transmission powers can allow the BS, which may have more computational and storage capabilities than the UE, to track histories of the UE's UL transmission powers. The BS can determine UL transmission configurations for the UE based on statistical information (e.g., the MPE profile) over a period of time rather than based on a particular instantaneous power report (e.g., a PHR), and thus may avoid selecting a beam index, a UL transmission power parameter, and/or a resource allocation that are overly conservative. The reporting of the instantaneous MPE violations by the UE can allow the BS to average out instantaneous MPE violations over a period of time rather than determining a UL transmission configuration that is overly conservative. As such, the disclosed embodiments can mitigate MPE constraints and improve UL transmission performance.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation NB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive MIMO. The BSs 105a-105c may take advantage of their higher dimensional MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system bandwidth into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system bandwidth. The system bandwidth may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105.

After establishing a connection, the UE 115 and the BS 105 can enter a normal operation stage or steady state, where operational data may be exchanged. For example, the BS 105 may schedule UL and/or DL transmissions by issuing UL transmission grants and/or DL transmission grants for the UE 115. Subsequently, the BS 105 and the UE 115 may communicate based on the issued grants.

In an embodiment, the network 100 may support UL power control. For example, during steady state, the UE 115 may transmit power headroom reports (PHRs) to the BS 105. Each PHR may indicate an amount of headroom between a current transmit power uses by the UE 115 for a PUSCH transmission and a maximum transmit power available at the UE 115. A positive-valued PHR may indicate that the UE 115 can transmit more data using a higher power than the current transmit power, whereas a negative-valued PHR may indicate that the UE 115 is already transmitting beyond the allowed limit (e.g., the maximum transmit power). The BS 105 may allocate UL resources for the UE 115 based on the PHRs. For example, the higher the PHR, the more UL resources (e.g., RBs) can be allocated to the UE 115. While PHRs can facilitate UL power control and allow the BSs 105 to allocate UL resources according to the UE 115's power headroom, PHRs can only provide an instantaneous view of the UE 115's current PUSCH transmission. Therefore, PHR-based power control can lead to a more conservative UL transmission configuration, and thus can be suboptimal.

In an embodiment, the network 100 may operate in an mmWave frequency band. The BSs 105 and the UEs 115 may include antenna arrays and may use analog beamforming and/or digital beamforming to form directional beams for communications. To meet MPE limits required by regulators, such as the FCC and the ICNIRP, a UE 115 may determine maximum allowable UL transmission powers based on detections of distances between the UE 115's antennas and a body part (e.g., a hand) of a user of the UE 115 at various time instants. The UE 115 may report or feedback the determined maximum allowable UL transmission powers to a serving BS 105. The BS 105 may determine an MPE profile (e.g., a long-term history or statistical information) for the UE 115 based on the feedbacks and determine UL transmission configurations for the UE 115 based on the MPE profile. In some embodiments, the UE 115 may provide the feedbacks to multiple BSs 105 (e.g., a serving BS 105 and one or more neighboring BSs 105) that are in coordination. The coordinating BSs 105 may jointly determine UL transmission configurations for the UEs 115 to meet MPE constraints. Mechanisms for meeting MPE constraints based on feedbacks from the UEs 115 and network assistances from the BSs 105 are described in greater detail herein.

Figure 2:
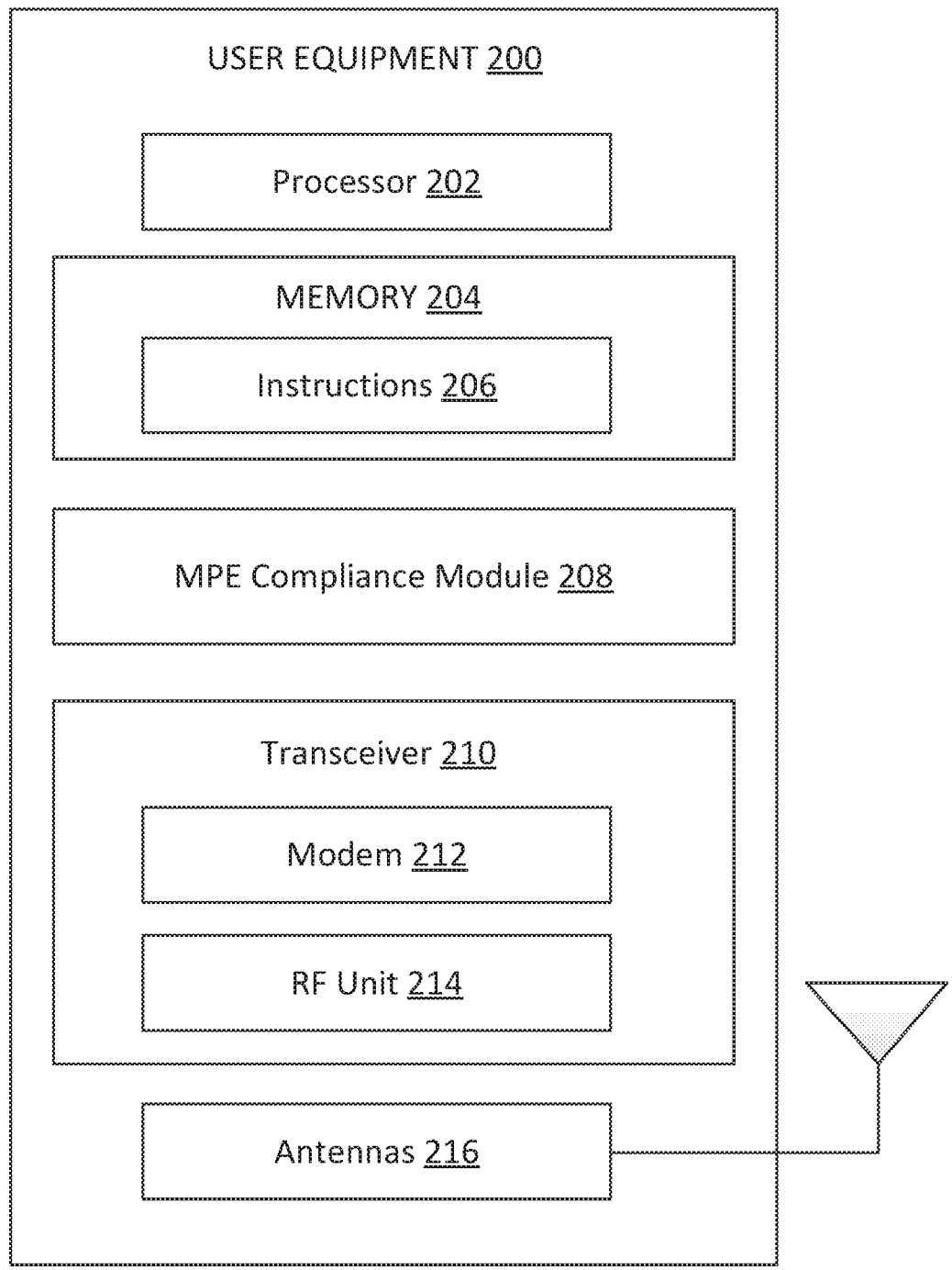
FIG. 2 is a block diagram of an exemplary user equipment (UE) according to embodiments of the present disclosure.

FIG. 2 is a block diagram of an exemplary UE 200 according to embodiments of the present disclosure. The UE 200 may be a UE 115 as discussed above. As shown, the UE 200 may include a processor 202, a memory 204, an MPE compliance module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure, for example, aspects of FIGS. 4-9. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The MPE compliance module 208 may be implemented via hardware, software, or combinations thereof. For example, the MPE compliance module 208 may be implemented as a processor, circuit, and/or instructions 206 stored in the memory 204 and executed by the processor 202. The MPE compliance module 208 may be used for various aspects of the present disclosure, for example, aspects of FIGS. 4-9. For example, the MPE compliance module 208 is configured to detect distances between the antennas 216 and body parts of a user of the UE 200 at various time instants, determine maximum allowable UL transmission powers satisfying MPE constraints for the detected distances, reports the maximum allowable UL transmission powers to one or more BSs (e.g., the BSs 105), receive UL transmission configurations from the BSs, transmit UL communication signals based on the received UL transmission configurations, and/or report instantaneous MPE violations, as described in greater detail herein.

As shown, the transceiver 210 may include the modem subsystem 212 and the RF unit 214. The transceiver 210 can be configured to communicate bi-directionally with other devices, such as the BSs 105. The modem subsystem 212 may be configured to modulate and/or encode the data from the memory 204, and/or the MPE compliance module 208 according to a modulation and coding scheme (MCS), e.g., a low-density parity check (LDPC) coding scheme, a turbo coding scheme, a convolutional coding scheme, a digital beamforming scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 115 or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 115 to enable the UE 115 to communicate with other devices.

The RF unit 214 may provide the modulated and/or processed data, e.g. data packets (or, more generally, data messages that may contain one or more data packets and other information), to the antennas 216 for transmission to one or more other devices. This may include, for example, transmission of maximum allowable UL transmission power reports to one or more BSs according to embodiments of the present disclosure. The antennas 216 may further receive data messages transmitted from other devices. This may include, for example, reception of UL transmission configurations from one or more BSs according to embodiments of the present disclosure. The antennas 216 may provide the received data messages for processing and/or demodulation at the transceiver 210. The antennas 216 may include multiple antennas of similar or different designs in order to sustain multiple transmission links. The RF unit 214 may configure the antennas 216.

Figure 3:
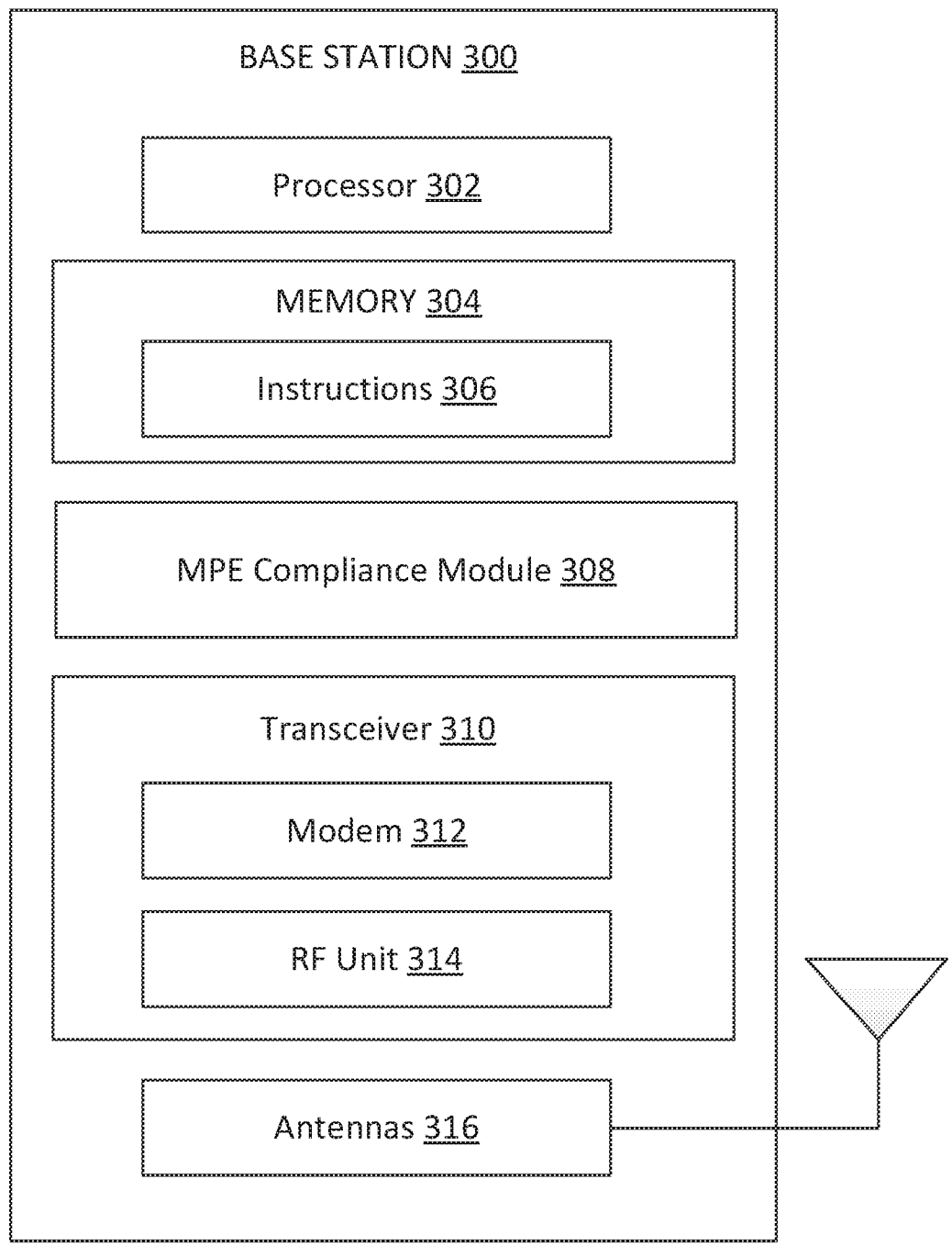
FIG. 3 is a block diagram of an exemplary base station (BS) according to embodiments of the present disclosure.

FIG. 3 is a block diagram of an exemplary BS 300 according to embodiments of the present disclosure. The BS 300 may be a BS 105 as discussed above. A shown, the BS 300 may include a processor 302, a memory 304, an MPE compliance module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein, for example, aspects of FIGS. 4-9. Instructions 306 may also be referred to as code, which may be interpreted broadly to include any type of computer-readable statement(s) as discussed above with respect to FIG. 2.

The MPE compliance module 308 may be implemented via hardware, software, or combinations thereof. For example, the MPE compliance module 308 may be implemented as a processor, circuit, and/or instructions 306 stored in the memory 304 and executed by the processor 302. The MPE compliance module 308 may be used for various aspects of the present disclosure, for example, aspects of FIGS. 4-9. For example, the MPE compliance module 308 is configured to receive reports of maximum allowable UL transmission powers satisfying MPE constraints from UEs UE (e.g., the UEs 115), maintain and track statistical information (e.g., MPE profiles) associated with corresponding UE's transmissions based on the reports, determine UL transmission configurations for the UEs based on the statistical information, receive instantaneous MPE violation reports from the UEs, and/or adjust UL transmission configurations for the UEs based the received instantaneous MPE reports, as described in greater detail herein.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or 200. The RF unit 314 may be further configured to perform analog beamforming in conjunction with the digital beamforming. Although shown as integrated together in transceiver 310, the modem subsystem 312 and the RF unit 314 may be separate devices that are coupled together at the BS 105 to enable the BS 105 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of UL transmission configurations to UEs according to embodiments of the present disclosure. The antennas 316 may further receive data messages transmitted from other devices and provide the received data messages for processing and/or demodulation at the transceiver 310. This may include, for example, reception of maximum allowable UL transmission power reports from UEs according to embodiments of the present disclosure. The antennas 316 may include multiple antennas of similar or different designs in order to sustain multiple transmission links.

Figure 4:
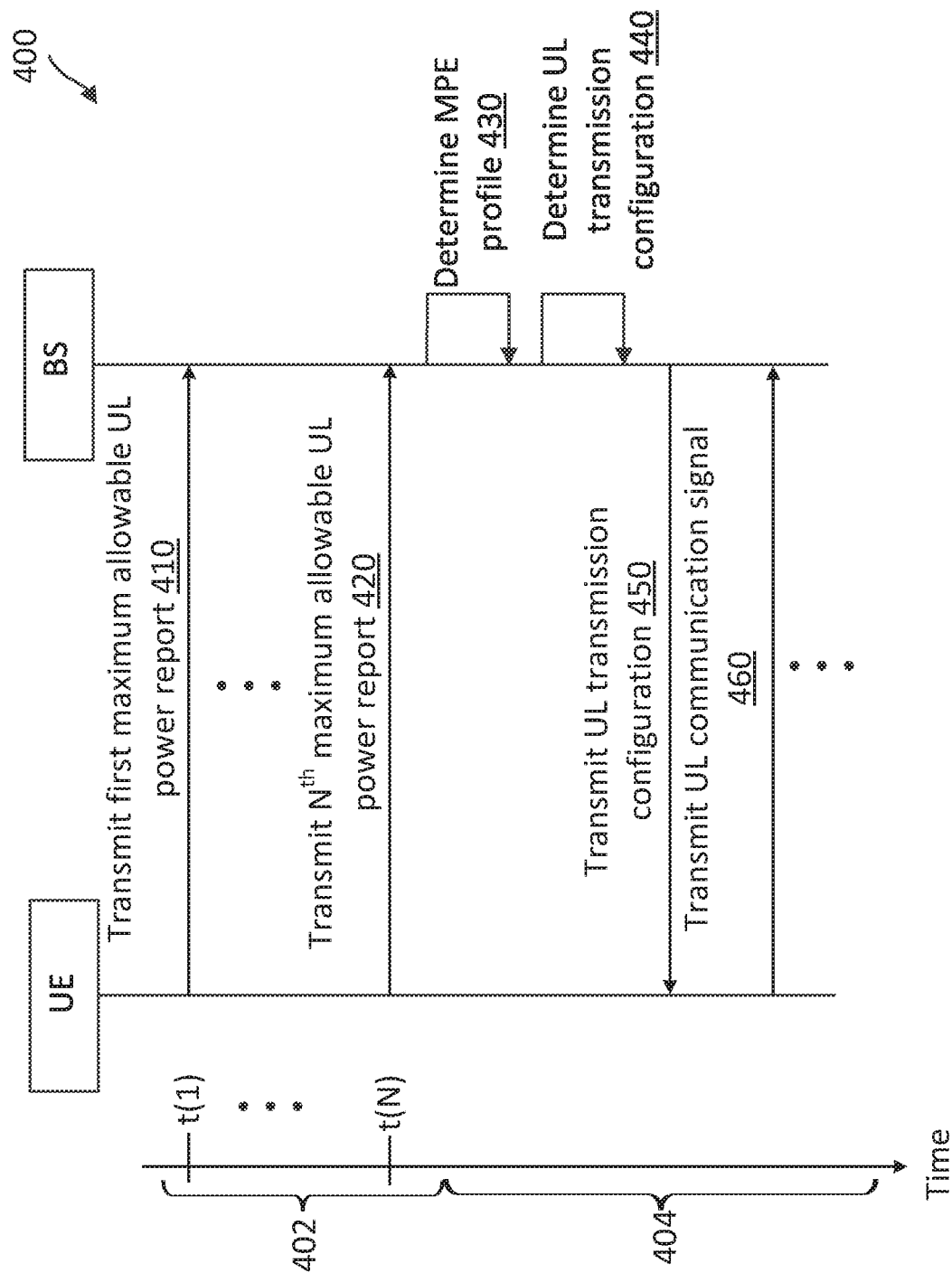
FIG. 4 is a signaling diagram of a communication method for maximum permissible exposure (MPE) compliance according to some embodiments of the present disclosure.

FIG. 4 is a signaling diagram of a communication method 400 for MPE compliance according to some embodiments of the present disclosure. The method 400 is implemented by a BS (e.g., the BSs 105 and 300) and a UE (e.g., the UEs 115 and 200) in a network (e.g., the network 100). Steps of the method 400 can be executed by computing devices (e.g., a processor, processing circuit, and/or other suitable component) of the BS and the UE. As illustrated, the method 400 includes a number of enumerated steps, but embodiments of the method 400 may include additional steps before, after, and in between the enumerated steps. In some embodiments, one or more of the enumerated steps may be omitted or performed in a different order.

At step 410, the UE transmits a first maximum allowable UL transmission power report, for example, at a first time instant, denoted as t(1), within a training period 402. The first maximum allowable UL transmission power report indicates a maximum allowable UL transmission power that the UE can transmit while satisfying an MPE constraint.

To determine the maximum allowable UL transmission power, the UE may transmit a detection signal via the UE's antennas (e.g., the antennas 216). The UE may configure the transmission of the detection signal such that the transmission creates a negligible amount of UL interference to the network. The UE may transmit the detection signal using unused or available UL resources. After transmitting the detection signal, the UE may detect a distance between the antennas and a body part (e.g., a hand) of a user of the UE based on the detection signal. For example, the UE may include a sensor or an RF circuitry located near the antenna for the detection. The detection may use near-field detection techniques or far-field detection techniques. The UE may determine an MPE constraint for the detected distance based on certain MPE rules imposed by regulators (e.g., FCC and/or ICNIRP). After determining the MPE constraint, the UE can determine the maximum allowable UL transmission power that the UE can transmit while meeting the MPE constraint. For example, the UE can backoff or reduce the UL transmission power until the MPE constraint is met.

In some embodiments, the MPE rules may be in the form of a lookup table or a chart of allowable power densities as a function of distance between an antenna and a body part. For example, a UE may be allowed to transmit at about 12 decibel-milliwatts (dBm) at a distance of about 10 millimeters (mm) from a body part and at about 10 dBm at a distance of about 5 mm from a body part.

The training period 402 can be predetermined, for example, according to a particular wireless communication standard or protocol. Alternatively, the training period 402 can be configured by the BS, either autonomously as a network protocol or based on one or more UEs' feedback. In particular, the training period 402 can be determined by the UE. The training period 402 may include any suitable duration. The training period 402 can include a fixed duration or a variable duration. The training period 402 can include periodic symbol allocations or aperiodic symbol allocations for the UE to transmit the reports. In some embodiments, the training period 402 can include about 100 subframes (e.g., about 100 milliseconds (ms)). In some embodiments, the training period 402 may vary depending on the location of the UE. For example, the training period 402 can be increased or decreased depending on whether the UE is located at a cell-edge or is proximal to the BS, respectively.

The UE may transmit one or more maximum allowable UL transmission power reports over the duration of the training period 402. For example, at step 420, the UE transmits an $N^{th}$ maximum allowable UL transmission power report indicating a maximum allowable UL transmission power, for example, at an $N^{th}$ time instant, denoted as t(N), within the training period 402. In some embodiments, the UE may be configured to transmit the maximum allowable UL power reports at certain time (e.g., at t(1), t(2), . . . , and at t(3)). For example, the BS may transmit a report configuration indicating the training period 402 and the reporting opportunities at time t(1) to t(N).

The maximum allowable UL transmission powers may vary due to the changing of the position of the UE's antennas, the UE's antenna subarrays, and/or the UE's antenna modules with respect to a user of the UE. For example, the user may hold the UE in a landscape orientation at one time instant and in a portrait orientation at another time instant. In some instances, the user may be in a call mode with the UE close to the ear. In some instances, the user may place the UE at a location not in contact with the user, for example, on a stand or a holder while watching a movie. In some instances, the user's body tissue profile along the skin surface can lead to near-field variations which can substantially alter the MPE compliance, and thus the maximum allowable UL transmission powers can be user dependent.

At step 430, the BS determines an MPE profile for the UE. For example, the BS may collect statistical information associated with the UE based on the maximum allowable UL transmission power reports received over the training period 402 and/or previous UL transmissions from the UE. The MPE profile can include temporal statistical information and/or spatial statistical information of the UE. For example, the BS can track transmission history of the UE. The history can include UL transmission powers and/or the UL beam indices used by the UE for the previous UL transmissions. In an embodiment, the beam index may be a reference to an entry in a beam codebook, where the entry may include information associated with beam direction and/or beam width. Mechanisms for constructing the MPE profile are described in greater detail herein.

At step 440, the BS determines a UL transmission configuration for the UE based on the MPE profile and/or a payload size requested by the UE (e.g., via a scheduling request). The UL transmission configuration can include at least one of a beam index, a UL transmission power parameter, or a resource allocation (e.g., number of RBs). Mechanisms for determining the UL transmission configuration based on the MPE profile are described in greater detail herein.

At step 450, the BS transmits the UL transmission configuration to the UE, for example, during a steady state period 404. For example, the BS may transmit the UL transmission configuration in a control portion (e.g., a physical downlink control channel (PDCCH)) of a subframe and the resources may be allocated from a data portion (e.g., a PUSCH) of a subframe.

At step 460, the UE transmits a UL communication signal to the BS based on the received UL transmission configuration during the steady state period 404, for example, during the PUSCH portion of the subframe indicated by the UL transmission configuration. For example, the UE may perform beamforming to generate a directional beam based on the beam index, configure the transmission power according to the UL transmission power parameter, and transmit a data signal over the directional beam at the configured transmission power using the allocated resources.

While FIG. 4 illustrates the training period 402 and the steady state period 404 as non-overlapping, in some embodiments, the training period 402 and steady state period 404 can be overlapping. For example, the UE can include two RF chains, one for training operations, such as the operations in the steps of 410 to 420, and one for steady state operations, such as the operations in the steps of 450 to 460. The BS may use various types of averaging to determine a long-term MPE profile metric for the UE, as described in greater detail herein. While not shown, the training period 402 can be repeated over the duration of the steady state period 404, for example, at every 1 minute, 2 minutes, 3 minutes or more depending on the cell deployment configuration.

In some embodiments, the BS may serve multiple UEs. The BS may repeat the same process for each UE to generate device-specific MPE profiles for the UEs. The BS may determine UL transmission configurations for the UEs based on corresponding device-specific MPE profiles.

Figure 5:
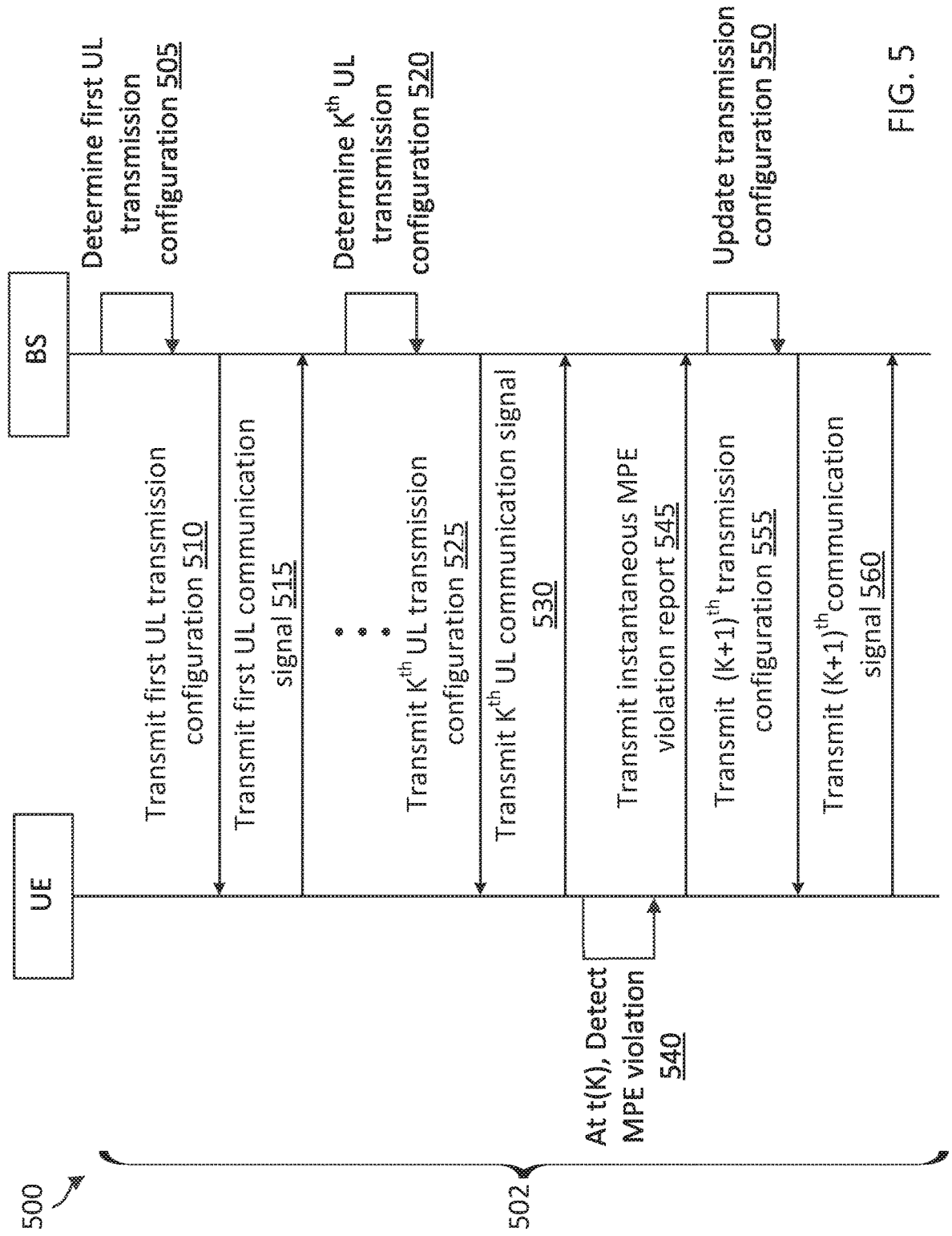
FIG. 5 is a signaling diagram of a communication method for MPE compliance according to some embodiments of the present disclosure.

FIG. 5 is a signaling diagram of a communication method 500 for MPE compliance according to some embodiments of the present disclosure. The method 500 is implemented by a BS (e.g., the BSs 105 and 300) and a UE (e.g., the UEs 115 and 200) in a network (e.g., the network 100). Steps of the method 500 can be executed by computing devices (e.g., a processor, processing circuit, and/or other suitable component) of the BS and the UE. As illustrated, the method 500 includes a number of enumerated steps, but embodiments of the method 500 may include additional steps before, after, and in between the enumerated steps. In some embodiments, one or more of the enumerated steps may be omitted or performed in a different order.

At step 505, the BS determines a first UL transmission configuration for the UE, for example, during a steady state period 502 similar to the steady state period 404. The BS and the UE may have completed at least some training operations, for example, as described in the steps of 410 to 430. The BS may have obtained an MPE profile or statistical information of the UE's UL transmissions as in the step 430 described above with respect to FIG. 4. The BS may determine the first UL transmission configuration based on the MPE profile.

At step 510, the BS transmits the first UL transmission configuration. Similar to the method 400, the BS may transmit the UL transmission configuration in a PDCCH portion of a subframe and the resources may be allocated from a PUSCH portion of a subframe.

At step 515, the UE transmits a first UL communication signal based on the first UL transmission configuration.

The BS may grant one or more UL transmission opportunities for the UE during the steady state period 502. For example, at step 520, the BS determines a $K^{th}$ UL transmission configuration for the UE based on the MPE profile of the UE.

At step 525, the BS transmits the $K^{th}$ UL transmission configuration.

At step 530, the UE transmits a $K^{th}$ UL communication signal based on the $K^{th}$ UL transmission configuration.

During the steady state period 502, the UE may monitor for instantaneous MPE violations and reports such violations to the BS. As shown, at step 540, the UE detects an MPE violation at a time t(K). For example, the UE can determine an instantaneous MPE constraint or MPE parameter at the time t(K) and may detect a violation based on the transmission of the $K^{th}$ UL communication signal exceeding the instantaneous MPE parameter as shown. Alternatively, the UE may detect the violation based on the $K^{th}$ UL transmission configuration assigned by the BS, for example, based on the assigned UL transmission power parameter or the assigned beam index in the $K^{th}$ UL transmission configuration without transmitting the $K^{th}$ UL communication signal.

At step 545, upon detecting the instantaneous MPE violation, the UE transmits an instantaneous MPE report to the BS notifying the BS of the violation.

At step 550, upon receiving the instantaneous MPE violation report, the BS may update the $K^{th}$ UL transmission configuration. For example, the BS may determine a $(K+1)^{th}$ UL transmission configuration for a subsequent UL transmission by updating or adjusting the beam index, the UL transmission power parameter, and/or the resource allocation in the $K^{th}$ UL transmission configuration. The BS can determine the $(K+1)^{th}$ UL transmission configuration by temporally and/or spatially averaging out the instantaneous MPE violations such that the UE may meet MPE constraints over a certain period of time and/or within a certain space.

At step 555, the BS transmits the $(K+1)^{th}$ UL transmission configuration.

At step 560, the UE transmits a $(K+1)^{th}$ UL communication signal based on the $(K+1)^{th}$ UL transmission configuration.

In an embodiment, the BS can update the MPE profile based on the UL transmission configurations and/or instantaneous MPE violations. As such, the MPE profile can provide a long-term history of the UE's UL transmissions, as described in greater detail herein.

Figure 6:
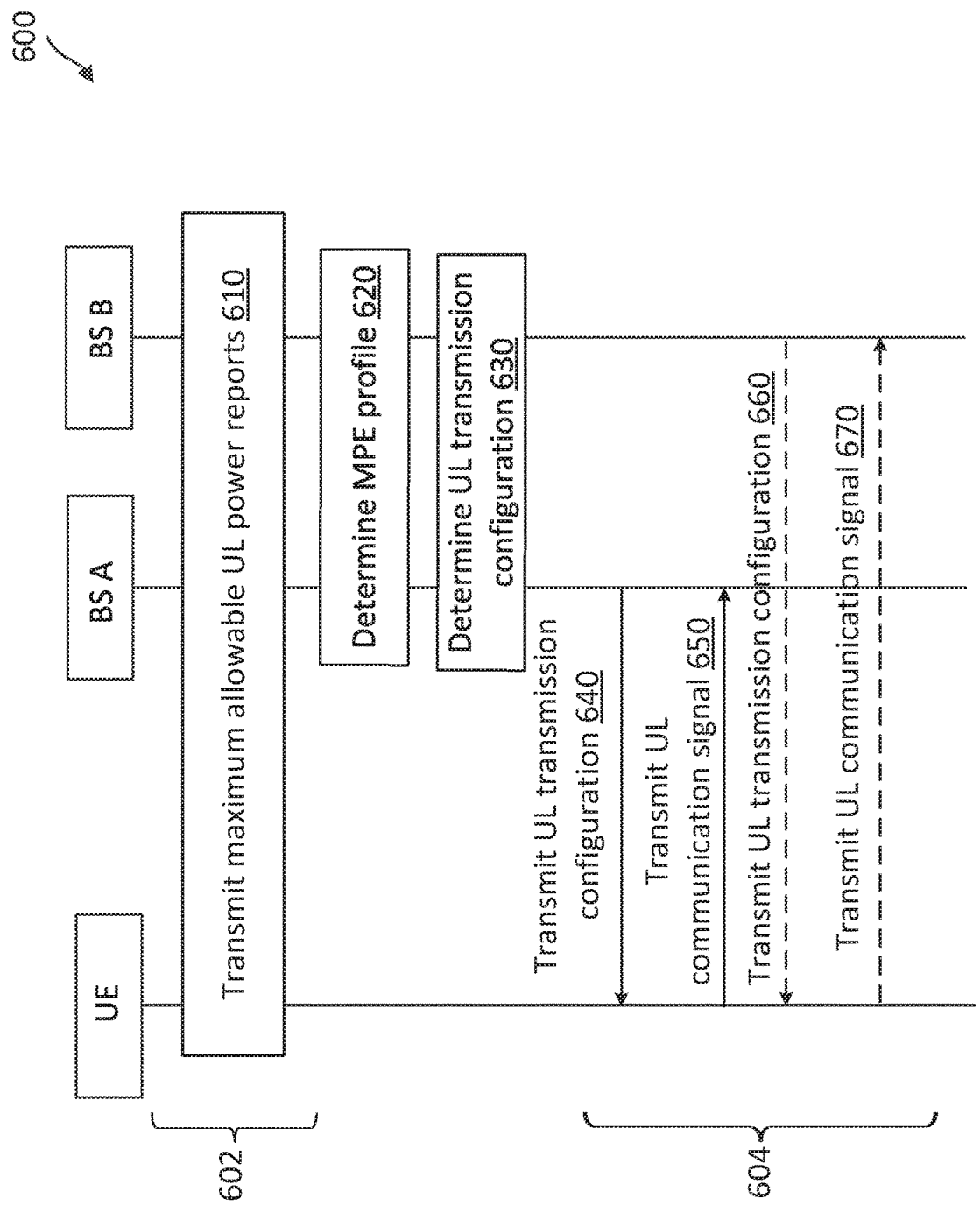
FIG. 6 is a signaling diagram of a communication method for MPE compliance according to some embodiments of the present disclosure.

FIG. 6 is a signaling diagram of a communication method 600 for MPE compliance according to some embodiments of the present disclosure. The method 600 is implemented by a BS A (e.g., the BSs 105 and 300), a BS B (e.g., the BSs 105 and 300), and a UE (e.g., the UEs 115 and 200) in a network (e.g., the network 100). The method 600 is substantially similar to the methods 400 and 500 described above with respect to FIGS. 4 and 5, respectively, but the tracking of the MPE profile and the determination of the UL transmission configuration can be coordinated among multiple BSs (e.g., the BS A and the BS B). Steps of the method 600 can be executed by computing devices (e.g., a processor, processing circuit, and/or other suitable component) of the BS and the UE. As illustrated, the method 600 includes a number of enumerated steps, but embodiments of the method 600 may include additional steps before, after, and in between the enumerated steps. In some embodiments, one or more of the enumerated steps may be omitted or performed in a different order.

At step 610, the UE may transmit one or more maximum allowable UL power reports to the BS A and the BS B, for example, during a training period 602 similar to the training period 402. The maximum allowable UL transmission power reports indicate maximum allowable UL transmission powers that the UE can transmit while satisfying an MPE constraint at various time instants during the training period 602. The UE may employ similar mechanisms as described in the method 400 to determine the maximum allowable UL transmission powers.

At step 620, the BS A and the BS B coordinate with each other (e.g., via backhaul communications) to determine an MPE profile for the UE. For example, the BS A may be a serving BS of the UE and the BS B may be a BS serving a neighboring cell.

At step 630, the BS A and the BS B coordinate with each other (e.g., via backhaul communications) to determine a UL transmission configuration for the UE based on the MPE profile of the UE. In some embodiments, the network may include multiple UEs. The BS A and the BS B may collect maximum allowable UL transmission powers from the UEs and coordinate with each other to generate a network-level device-specific MPE profile or a geographic MPE map, as described in greater detail herein. In such embodiments, the BS A and the BS B can coordinate with each other to determine the UL transmission configuration for the UE based on the network-level device-specific MPE profile.

At step 640, the BS A transmits the UL transmission configuration to the UE during a steady state period 604 similar to the steady state periods 404 and 502. For example, the BS A and the BS B may determine that the BS A is more suitable or effective (e.g., a better performance) in receiving a beam from the UE than the BS B. Subsequently, at step 650, the UE may transmit a UL communication signal to the BS A.

Alternatively, the BS A and the BS B may determine that the BS B is more suitable or effective in receiving a beam from the UE than the BS B. As shown by the dashed arrows, the BS B may transmit the UL transmission configuration to the UE at step 660 and the UE may transmit a UL communication signal to the BS B at step 670. As such, the BS A and/or the BS B can include a beam handover instruction or indication in the UL transmission configuration switching UL receptions between the BS A and the BS B.

Figure 7:
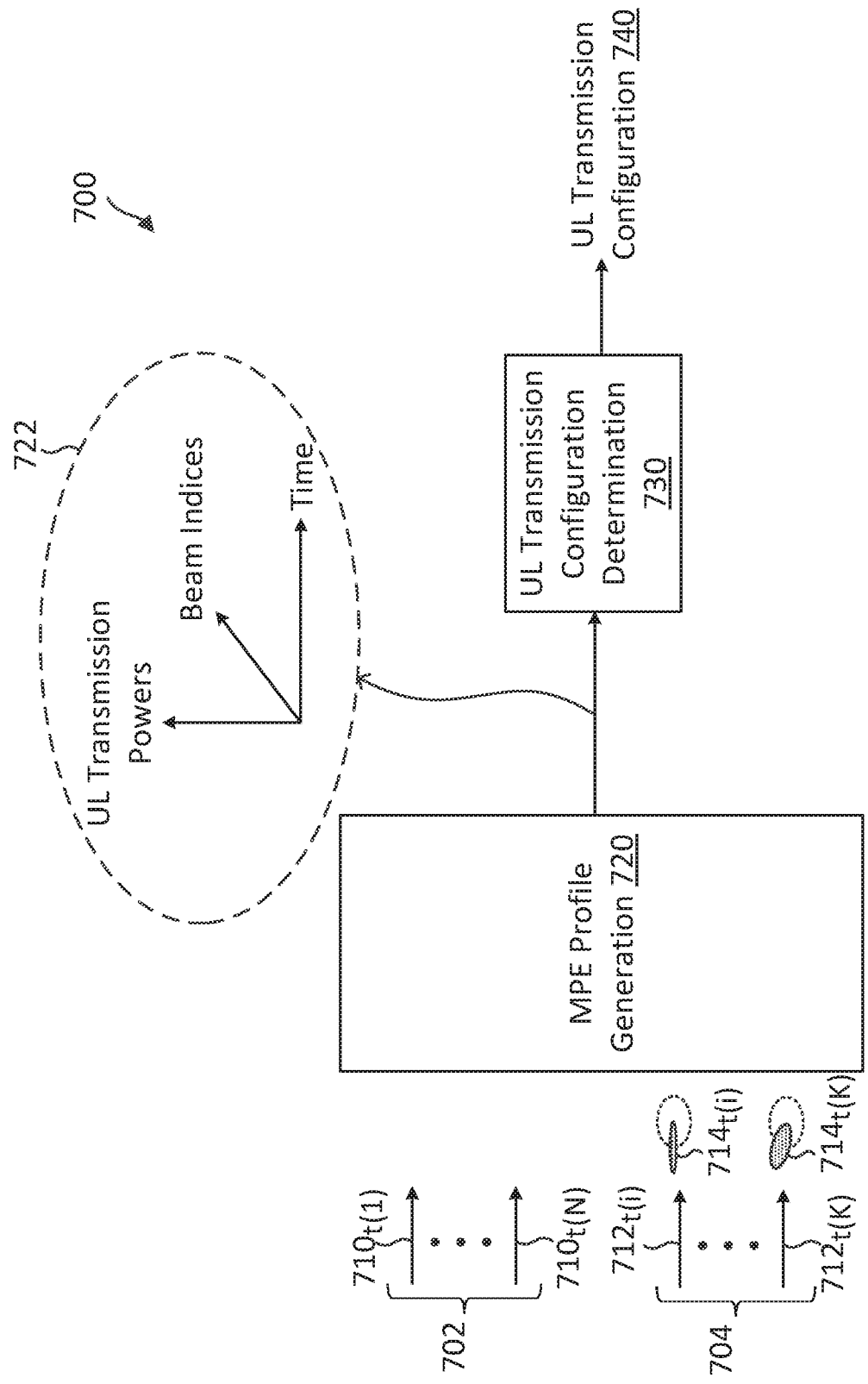
FIG. 7 is a schematic diagram illustrating an uplink (UL) configuration method for MPE compliance according to some embodiments of the present disclosure.

FIG. 7 is a schematic diagram illustrating a UL configuration method 700 for MPE compliance according to some embodiments of the present disclosure. The method 700 can be employed by a BS such as the BSs 105 and 300. For example, the BS may include an MPE profile generation component 720 and a UL transmission configuration determination component 730. The BS may implement the method 700 in the steps of 430 and 440 of the method 400 described above with respect to FIG. 4, in the steps of 505, 520, and 550 of the method 500 described above with respect to FIG. 5, and/or in the steps of 620 and 630 of the method 600 described above with respect to FIG. 6.

As similarly described above, the BS may receive a plurality of reports 710 from a UE. Each reports 710 may indicate a maximum allowable UL transmission power satisfying an MPE constraint or an MPE parameter at a certain time instant, for example, according to certain MPE regulations (e.g., from FCC and/or ICNIRP). The BS may receive the reports 710 at various time instants (e.g., t(1) t(N)) or reporting opportunities over a training period 702 (e.g., the training period 402 and 602). The reports 710 are shown as $710_{t(1)}$ to $710_{t(N)}$ corresponding to reports at time instants t(1) to t(N), respectively.

In addition, the BS may receive a plurality of UL transmissions 712 from a UE (e.g., the UEs 115 and 200) at various time instants (e.g., t(i) t(K)) during a steady state period 704 (e.g., the steady state periods 404, 502, and 604). The UL transmissions 712 may be transmitted using various beams 714 with different beam widths and/or beam directions. The BS may determine a UL transmission power, a UL reception power, and/or a beam index for each of the UL transmissions 712. The beam index may represent a beam width and/or a beam direction of a beam 714 used for a corresponding UL transmission 712. The UL transmissions 712 are shown as $712_{t(i)}$ to $710_{t(K)}$ corresponding to UL transmissions at the time instants t(i) to t(K), respectively.

The MPE profile generation component 720 may receive power information and/or beam information associated with the reports 710 and/or the UL transmissions 712. The MPE profile generation component 720 can be configured to generate an MPE profile 722 of the UE's UL transmissions over time and space. The MPE profile 722 can be in the form of a three-dimensional (3D) view or chart. The MPE profile 722 may track UL transmission powers and beam indices as a function of time. For example, the x-axis may represent time in some constant units, the y-axis may represent UL transmission powers in some constant units, and the z-axis may represent beam indices in some constant units. Thus, a 2D x-y slice of the MPE profile 722 may provide temporal statistical information for the UE and a 2D y-z slice of the MPE profile 722 may provide spatial statistical information for the UE.

The UL transmission configuration determination component 730 may receive the MPE profile 722 and determine a UL transmission configuration 740 for the UE. The UL transmission configuration determination component 730 can apply long-term averaging, medium-term averaging, or short-term averaging to the statistical information (e.g., the collected UL transmission powers over time) in the MPE profile 722 to obtain an MPE metric. The UL transmission configuration determination component 730 can apply an averaging function, such as a weighted average, a moving average, an exponential average, or a filter, to the statistical information to obtain an MPE metric. The UL transmission configuration determination component 730 may determine a beam index parameter, a UL transmission power parameter, and/or resources (e.g., a number of RBs) based on the MPE metric and a payload size requested by the UE (e.g., via a scheduling request). The UL transmission configuration determination component 730 may output the UL transmission configuration 740 including the determined beam index parameter, the determined UL transmission power parameter, and/or the determined resources. In some embodiments, the UL transmission configuration determination component 730 can further determine the UL transmission configuration 740 based on a confidence level. A higher confidence level (e.g., at about 98 percent (%)) can produce a more conservative UL assignment (e.g., a lower UL transmission power, less RBs, and/or a narrower beam width) than a lower confidence level (e.g., about 80%). In some embodiments, the UL transmission configuration determination component 730 may vary or adjust the confidence level based on various network conditions, for example, network traffic, channel conditions, and/or the positioning of the UE with respect to the BS.

In some embodiments, the UL transmission configuration 740 can indicate quantized parameters. For example, the UL transmission configuration 740 can indicate a narrow beam width, a medium beam width, or a wide beam width. In some embodiments, the UL transmission configuration 740 can indicate relative parameters. For example, the UL transmission configuration 740 can indicate a wider beam width or a narrower beam width, for example, where the step size for increasing or decreasing the beam width may be predetermined or preconfigured. Similarly, the UL transmission configuration 740 can indicate a higher UL transmission power or a lower UL transmission power, for example, the step size for increasing or decreasing the UL transmission power may be predetermined or preconfigured.

In an embodiment, the MPE profile generation component 720 may be jointly operated by multiple BSs in coordination, for example, as shown in the method 600 describe above with respect to FIG. 6. In such an embodiment, the MPE profile generation component 720 may collect statistical information associated with UL transmission powers and beam indices of multiple UEs. The MPE profile generation component 720 may generate a network-level MPE map including a multi-dimensional MPE view, for example, charting beam indices and UL transmission powers as a function of time for each UE.

Figure 8:
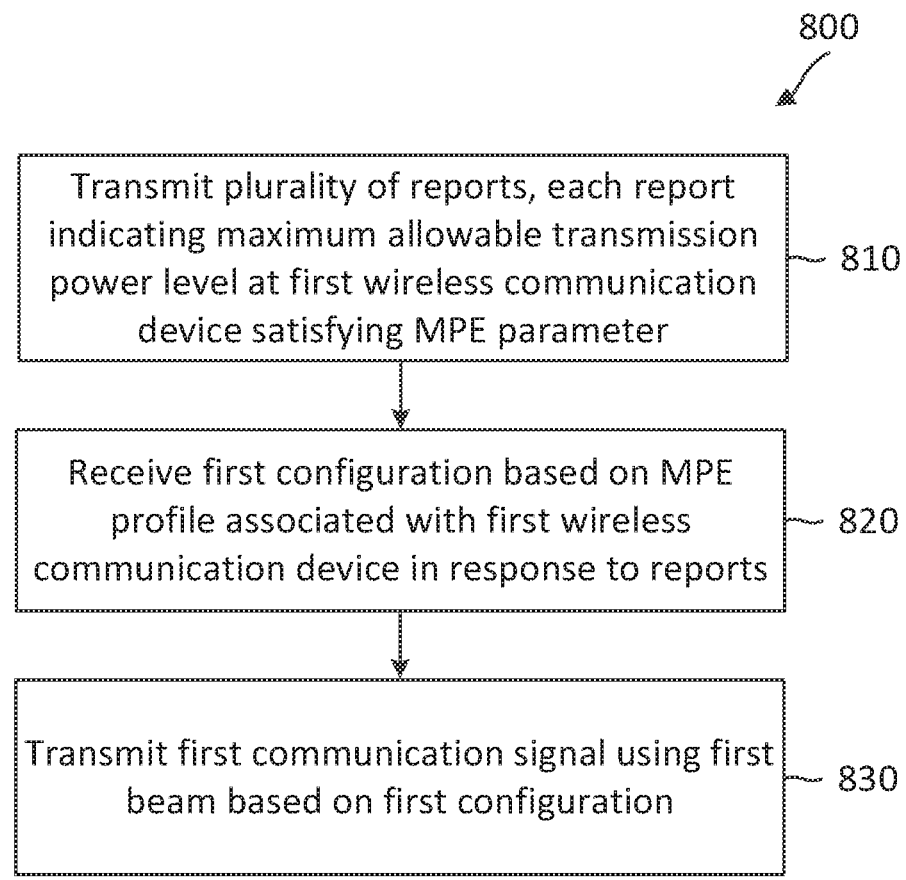
FIG. 8 is a flow diagram of a communication method for MPE compliance according to embodiments of the present disclosure.

FIG. 8 is a flow diagram of a communication method 800 for MPE compliance according to embodiments of the present disclosure. Steps of the method 800 can be executed by a computing device (e.g., a processor, processing circuit, and/or other suitable component) of a wireless communication device or other suitable means for performing the steps. For example, a wireless communication device, such as the UE 115 or UE 200, may utilize one or more components, such as the processor 202, the memory 204, the MPE compliance module 208, the transceiver 210, the modem 212, and the one or more antennas 216, to execute the steps of method 800. The method 800 may employ similar mechanisms as in the methods 400, 500, 600, and/or 700 described with respect to FIGS. 4, 5, 6, and/or 7, respectively. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the method 800 includes transmitting, by a first wireless communication device to a second wireless communication device, a plurality of reports (e.g., the reports 710), each report indicating a maximum allowable transmission power level at first wireless communication device satisfying an MPE parameter. The first wireless communication device may be a UE and the second wireless communication device may be a BS (e.g., the BSs 105 and 300). The MPE parameter may be an MPE constraint determined by regulators, such as the FCC and/or the ICNIRP, as a function of time and/or space with respect to a user body.

At step 820, the method 800 includes receiving, by the first wireless communication device from the second wireless communication device, a first configuration (e.g., the configuration 740) based on an MPE profile (e.g., the MPE profile 722) associated with the first wireless communication device in response to the reports.

At step 830, the method 800 includes transmitting, by the first wireless communication device to the second wireless communication device, a first communication signal using a first beam based on the first configuration.

In some embodiments, the first wireless communication device can determine the maximum allowable transmission power levels at various time instants over a training period (e.g., the training periods 402, 602, and 702), where each maximum allowable transmission power level satisfies an MPE parameter at a corresponding time instant. The MPE profile can include statistical information associated with at least the maximum allowable transmission power levels over the training period.

In some embodiments, the first wireless communication device can receive a report configuration indicating the training period and/or reporting opportunities from the second wireless communication device.

In some embodiments, the first wireless communication device can transmit the first communication signal using the first beam based at least on one of a beam index, a transmission power parameter, or a resource allocation in the first configuration.

In some embodiments, the first wireless communication device can determine whether the transmitting the first communication signal satisfies an instantaneous MPE parameter. When determining that the transmitting the first communication signal does not satisfy the instantaneous MPE parameter, the first wireless communication device can transmit an instantaneous MPE violation report to the second wireless communication device. The first wireless communication device can receive a second configuration in response to the instantaneous MPE violation report from the second wireless communication device. The second configuration can indicate at least one of a beam index, a transmission power parameter, or a resource allocation updated from the first configuration. Subsequently, the first wireless communication device can transmit a second communication signal based on the second configuration.

In some embodiments, the first wireless communication device can further transmit the plurality of reports to a third wireless communication device (e.g., another BS). The first wireless communication device can transmit a second communication signal using a second beam different from the first beam to the third wireless communication device. For example, the first configuration can indicate an instruction to handover the first wireless communication device from the second wireless communication device to the third wireless communication device.

Figure 9:
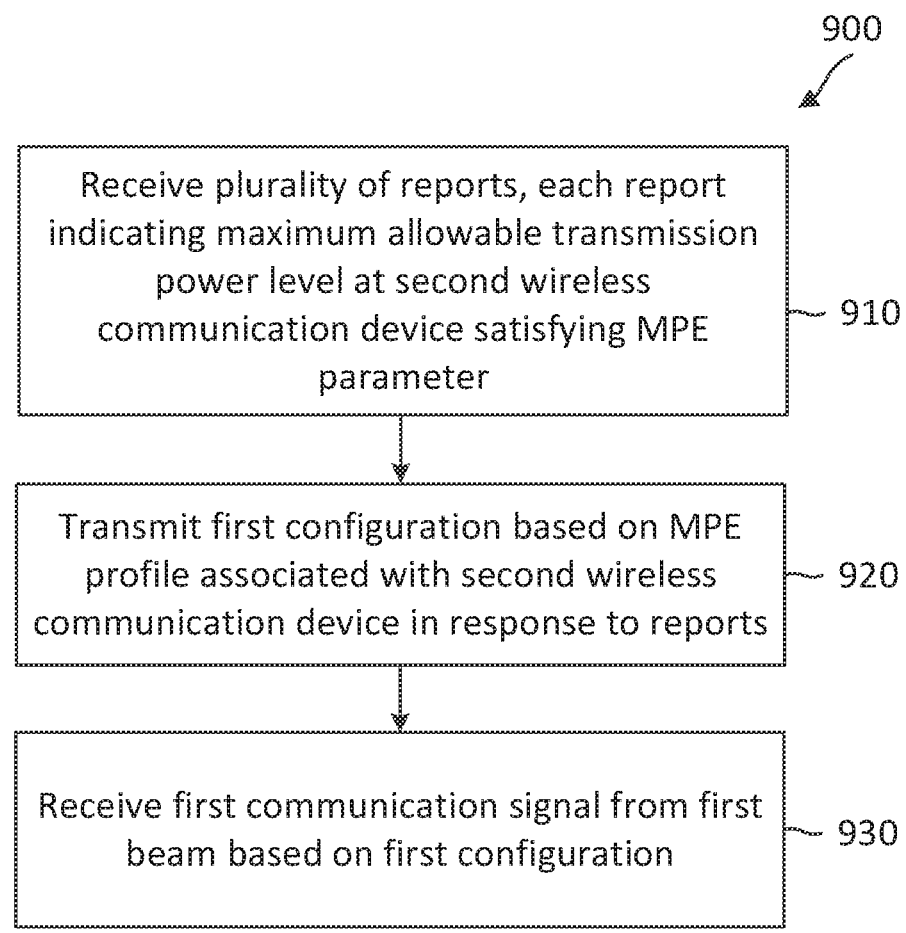
FIG. 9 is a flow diagram of a communication method for MPE compliance according to embodiments of the present disclosure.

FIG. 9 is a flow diagram of a communication method 900 for MPE compliance according to embodiments of the present disclosure. Steps of the method 900 can be executed by a computing device (e.g., a processor, processing circuit, and/or other suitable component) of a wireless communication device or other suitable means for performing the steps. For example, a wireless communication device, such as the BS 105 or BS 300, may utilize one or more components, such as the processor 302, the memory 304, the MPE compliance module 308, the transceiver 310, the modem 312, and the one or more antennas 316, to execute the steps of method 900. The method 900 may employ similar mechanisms as in the methods 400, 500, 600, and/or 700 described with respect to FIGS. 4, 5, 6, and/or 7, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes receiving, by a first wireless communication device from a second wireless communication device, a plurality of reports (e.g., the reports 710), each report indicating a maximum allowable transmission power level at the first wireless communication device satisfying an MPE parameter. The first wireless communication device may be a BS and the second wireless communication device may be a UE (e.g., the UEs 115 and 200). The MPE parameter may be an MPE constraint determined by regulators, such as the FCC and/or the ICNIRP, as a function of time and/or space with respect to a user body.

At step 920, the method 900 includes transmitting, by the first wireless communication device to the second wireless communication device, a first configuration (e.g., the configuration 740) based on an MPE profile (e.g., the MPE profile 722) associated with the second wireless communication device in response to the plurality of reports.

At step 930, the method 900 includes receiving, by the first wireless communication device from the second wireless communication device, a first communication signal from a first beam based on the first configuration.

In some embodiments, the first wireless communication device can determine the MPE profile associated with the second wireless communication device based at least on the plurality of reports and determine the first configuration including at least one of a beam index, a transmission power parameter, or a resource allocation based at least on the MPE profile.

In some embodiments, the first wireless communication device can receive the plurality of reports at various time instants over a training period (e.g., the training periods 402, 602, and 702), where each maximum allowable transmission power level satisfies an MPE parameter at a corresponding time instant. The first wireless communication device can determine the MPE profile including statistical information associated with the maximum allowable transmission power levels over the training period.

In some embodiments, the first wireless communication device can transmit a report configuration indicating the training period to the second wireless communication device.

In some embodiments, the first wireless communication device can receive an instantaneous MPE violation report associated with the transmitting the first communication signal from the second wireless communication device. The first wireless communication device can determine a second configuration by adjusting at least one of at least one of a beam index, a transmission power parameter, or a resource allocation in the first configuration in response to the instantaneous MPE violation report. The first wireless communication device can transmit the second configuration to the second wireless communication device. The first wireless communication device can receive a second communication signal from the second wireless communication device based on the second configuration.

In some embodiments, the first wireless communication device can coordinate with a third wireless communication device (e.g., another BS) to determine the first configuration based on the MPE profile associated with the second wireless communication device. For example, the first wireless communication device can coordinate with the third wireless communication device to determine network-level MPE profile associated with a plurality of wireless communication devices in a network, where the plurality of wireless communication devices includes the second wireless communication device. The first wireless communication device can coordinate with the third wireless communication device to handover the second wireless communication device from the third wireless communication device to the first wireless communication device based on the network-level MPE profile.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   transmitting, by a first wireless communication device to a second wireless communication device, a plurality of reports, each report indicating an allowable transmission power level at the first wireless communication device satisfying a maximum permissible exposure (MPE) parameter;
   receiving, by the first wireless communication device from the second wireless communication device, a first configuration based on an MPE profile associated with the first wireless communication device in response to the plurality of reports, wherein the MPE profile includes statistical information associated with at least the allowable transmission power levels; and
   transmitting, by the first wireless communication device to the second wireless communication device, a first communication signal over a first beam based on the first configuration.

2. The method of claim 1, wherein the transmitting the first communication signal includes transmitting the first communication signal over the first beam based at least on one of a beam index, a transmission power parameter, or a resource allocation in the first configuration.

3. The method of claim 1, further comprising:
   determining, by the first wireless communication device, the allowable transmission power levels over a training time period,
   wherein the MPE profile includes the statistical information associated with at least the allowable transmission power levels over the training time period.

4. The method of claim 3, further comprising:
   receiving, by the first wireless communication device from the second wireless communication device, a report configuration indicating the training time period.

5. The method of claim 1, further comprising:
   determining, by the first wireless communication device, whether the transmitting the first communication signal satisfies an instantaneous MPE parameter; and
   transmitting, by the first wireless communication device to the second wireless communication device, an instantaneous MPE violation report when determining that the transmitting the first communication signal does not satisfy the instantaneous MPE parameter.

6. The method of claim 5, further comprising:
   receiving, by the first wireless communication device from the second wireless communication device, a second configuration in response to the instantaneous MPE violation report, the second configuration indicating at least one of an updated beam index, an updated transmission power parameter, or an updated resource allocation; and
   transmitting, by the first wireless communication device, a second communication signal based on the second configuration.

7. The method of claim 1, further comprising:
   transmitting, by the first wireless communication device to a third wireless communication device, the plurality of reports,
   wherein the second wireless communication device and the third wireless communication device are different.

8. The method of claim 7, further comprising:
   transmitting, by the first wireless communication device to the third wireless communication device, a second communication signal over a second beam different from the first beam,
   wherein the first configuration indicates an instruction to handover from the second wireless communication device to the third wireless communication device.

9. A method of wireless communication, comprising:
   receiving, by a first wireless communication device from a second wireless communication device, a plurality of reports, each report indicating an allowable transmission power level at the second wireless communication device satisfying a maximum permissible exposure (MPE) parameter;
   transmitting, by the first wireless communication device to the second wireless communication device, a first configuration based on an MPE profile associated with the second wireless communication device in response to the plurality of reports, wherein the MPE profile includes statistical information associated with at least the allowable transmission power levels; and
   receiving, by the first wireless communication device from the second wireless communication device, a first communication signal over a first beam based on the first configuration.

10. The method of claim 9, further comprising:
  determining, by the first wireless communication device, the MPE profile associated with the second wireless communication device based at least on the plurality of reports; and
  determining, by the first wireless communication device, the first configuration including at least one of a beam index, a transmission power parameter, or a resource allocation based at least on the MPE profile.

11. The method of claim 9, wherein the receiving the plurality of reports includes receiving the plurality of reports over a training time period, and wherein the method further comprises:
  determining, by the first wireless communication device, the MPE profile including the statistical information associated with the allowable transmission power levels over the training time period.

12. The method of claim 11, further comprising:
  transmitting, by the first wireless communication device to the second wireless communication device, a report configuration indicating the training time period.

13. The method of claim 9, further comprising:
  receiving, by the first wireless communication device from the second wireless communication device, an instantaneous MPE violation report associated with the transmitting the first communication signal.

14. The method of claim 13, further comprising:
  determining, by the first wireless communication device, a second configuration by adjusting at least one of at least one of a beam index, a transmission power parameter, or a resource allocation in the first configuration in response to the instantaneous MPE violation report;
  transmitting, by the first wireless communication device to the second wireless communication device, the second configuration; and
  receiving, by the first wireless communication device from the second wireless communication device, a second communication signal based on the second configuration.

15. The method of claim 9, further comprising:
  coordinating, by the first wireless communication device with a third wireless communication device, to determine the first configuration based on the MPE profile associated with the second wireless communication device.

16. The method of claim 15, wherein the coordinating includes:
  coordinating, by the first wireless communication device with the third wireless communication device, to determine a network-level MPE profile associated with a plurality of wireless communication devices in a network, the plurality of wireless communication devices including the second wireless communication device; and
  coordinating, by the first wireless communication device with the third wireless communication device, to handover the second wireless communication device from the first wireless communication device to the third wireless communication device based on the network-level MPE profile.

17. An apparatus comprising:
  a transceiver configured to:
    transmit, to a second wireless communication device, a plurality of reports, each report indicating an allowable transmission power level at the apparatus satisfying a maximum permissible exposure (MPE) parameter;
    receive, from the second wireless communication device, a first configuration based on an MPE profile associated with the apparatus in response to the plurality of reports, wherein the MPE profile includes statistical information associated with at least the allowable transmission power levels; and
    transmit, to the second wireless communication device, a first communication signal over a first beam based on the first configuration.

18. The apparatus of claim 17, wherein the transceiver is further configured to transmit the first communication signal by transmitting the first communication signal over the first beam based at least on one of a beam index, a transmission power parameter, or a resource allocation in the first configuration.

19. The apparatus of claim 17, further comprising:
  a processor configured to determine the allowable transmission power levels over a training time period,
  wherein the MPE profile includes the statistical information associated with at least the allowable transmission power levels over the training time period.

20. The apparatus of claim 19, wherein the transceiver is further configured to:
  receive, from the second wireless communication device, a report configuration indicating the training time period.

21. The apparatus of claim 17, further comprising:
  a processor configured to determine whether the transmission of the first communication signal satisfies an instantaneous MPE parameter,
  wherein the transceiver is further configured to transmit, to the second wireless communication device, an instantaneous MPE violation report when determining that the transmission of the first communication signal does not satisfy the instantaneous MPE parameter.

22. The apparatus of claim 21, wherein the transceiver is further configured to:
  receive, from the second wireless communication device, a second configuration in response to the instantaneous MPE violation report, the second configuration indicating at least one of an updated beam index, an updated transmission power parameter, or an updated resource allocation; and
  transmit a second communication signal based on the second configuration.

23. The apparatus of claim 17, wherein the transceiver is further configured to:
  transmit, to a third wireless communication device, the plurality of reports, and
  wherein the second wireless communication device and the third wireless communication device are different.

24. The apparatus of claim 23, wherein the transceiver is further configured to:
  transmit, to the third wireless communication device, a second communication signal over a second beam different from the first beam, and
  wherein the first configuration indicates an instruction to handover from the second wireless communication device to the third wireless communication device.

25. An apparatus comprising:
  a transceiver configured to:
    receive, from a second wireless communication device, a plurality of reports, each report indicating an allowable transmission power level at the second wireless communication device satisfying a maximum permissible exposure (MPE) parameter;

transmit, to the second wireless communication device, a first configuration based on an MPE profile associated with the second wireless communication device in response to the plurality of reports, wherein the MPE profile includes statistical information associated with at least the allowable transmission power levels; and receive, from the second wireless communication device, a first communication signal over a first beam based on the first configuration.

26. The apparatus of claim 25, further comprising a processor configured to:
determine the MPE profile associated with the second wireless communication device based at least on the plurality of reports; and
determine the first configuration including at least one of a beam index, a transmission power parameter, or a resource allocation based at least on the MPE profile.

27. The apparatus of claim 25, wherein the transceiver is further configured to receive the plurality of reports by receiving the plurality of reports over a training time period, and wherein the apparatus further comprises:
a processor is further configured to determine the MPE profile including the statistical information associated with the allowable transmission power levels over the training time period.

28. The apparatus of claim 27, wherein the transceiver is further configured to:
transmit, to the second wireless communication device, a report configuration indicating the training time period.

29. The apparatus of claim 25, wherein the transceiver is further configured to:
receive, from the second wireless communication device, an instantaneous MPE violation report associated with the transmission of the first communication signal.

30. The apparatus of claim 29, further comprising:
a processor configured to determine a second configuration by adjusting at least one of at least one of a beam index, a transmission power parameter, or a resource allocation in the first configuration in response to the instantaneous MPE violation report,
wherein the transceiver is further configured to:
transmit, to the second wireless communication device, the second configuration; and
receive, from the second wireless communication device, a second communication signal based on the second configuration.

31. The apparatus of claim 25, further comprising:
a processor configured to coordinate, with a third wireless communication device, to determine the first configuration based on the MPE profile associated with the second wireless communication device.

32. The apparatus of claim 31, wherein the processor is further configured to coordinate by:
coordinating, with the third wireless communication device, to determine a network-level MPE profile associated with a plurality of wireless communication devices in a network, the plurality of wireless communication devices including the second wireless communication device; and
coordinating, with the third wireless communication device, to handover the second wireless communication device from the apparatus to the third wireless communication device based on the network-level MPE profile.

33. A non-transitory computer-readable medium having program code recorded thereon, the program code comprising:
code for causing a first wireless communication device to transmit, to a second wireless communication device, a plurality of reports, each report indicating an allowable transmission power level at the first wireless communication device satisfying a maximum permissible exposure (MPE) parameter;
code for causing the first wireless communication device to receive, from the second wireless communication device, a first configuration based on an MPE profile associated with the first wireless communication device in response to the plurality of reports, wherein the MPE profile includes statistical information associated with at least the allowable transmission power levels; and
code for causing the first wireless communication device to transmit, to the second wireless communication device, a first communication signal over a first beam based on the first configuration.

34. The non-transitory computer-readable medium of claim 33, wherein the code for causing the first wireless communication device to transmit the first communication signal is further configured to transmit the first communication signal over the first beam based at least on one of a beam index, a transmission power parameter, or a resource allocation in the first configuration.

35. The non-transitory computer-readable medium of claim 33, further comprising:
code for causing the first wireless communication device to determine the allowable transmission power levels over a training time period,
wherein the MPE profile includes the statistical information associated with at least the allowable transmission power levels over the training time period.

36. The non-transitory computer-readable medium of claim 35, further comprising:
code for causing the first wireless communication device to receive, from the second wireless communication device, a report configuration indicating the training time period.

37. The non-transitory computer-readable medium of claim 33, further comprising:
code for causing the first wireless communication device to determine whether the transmission of the first communication signal satisfies an instantaneous MPE parameter; and
code for causing the first wireless communication device to transmit, to the second wireless communication device, an instantaneous MPE violation report when determining that the transmission of the first communication signal does not satisfy the instantaneous MPE parameter.

38. The non-transitory computer-readable medium of claim 37, further comprising:
code for causing the first wireless communication device to receive, from the second wireless communication device, a second configuration in response to the instantaneous MPE violation report, the second configuration indicating at least one of an updated beam index, an updated transmission power parameter, or an updated resource allocation; and
code for causing the first wireless communication device to transmit a second communication signal based on the second configuration.

39. The non-transitory computer-readable medium of claim 33, further comprising:
   code for causing the first wireless communication device to transmit, to a third wireless communication device, the plurality of reports,
   wherein the second wireless communication device and the third wireless communication device are different.

40. The non-transitory computer-readable medium of claim 39, further comprising:
   code for causing the first wireless communication device to transmit, to the third wireless communication device, a second communication signal over a second beam different from the first beam,
   wherein the first configuration indicates an instruction to handover from the second wireless communication device to the third wireless communication device.

41. A non-transitory computer-readable medium having program code recorded thereon, the program code comprising:
   code for causing a first wireless communication device to receiving, from a second wireless communication device, a plurality of reports, each report indicating an allowable transmission power level at the second wireless communication device satisfying a maximum permissible exposure (MPE) parameter;
   code for causing the first wireless communication device to transmit, to the second wireless communication device, a first configuration based on an MPE profile associated with the second wireless communication device in response to the plurality of reports, wherein the MPE profile includes statistical information associated with at least the allowable transmission power levels; and
   code for causing the first wireless communication device to receive, from the second wireless communication device, a first communication signal over a first beam based on the first configuration.

42. The non-transitory computer-readable medium of claim 41, further comprising:
   code for causing the first wireless communication device to determine the MPE profile associated with the second wireless communication device based at least on the plurality of reports; and
   code for causing the first wireless communication device to determine the first configuration including at least one of a beam index, a transmission power parameter, or a resource allocation based at least on the MPE profile.

43. The non-transitory computer-readable medium of claim 41, wherein the code for causing the first wireless communication device to receive the plurality of reports is further configured to receive the plurality of reports over a training time period, and wherein the computer-readable medium further comprises:
   code for causing the first wireless communication device to determine the MPE profile including the statistical information associated with the allowable transmission power levels over the training time period.

44. The non-transitory computer-readable medium of claim 43, further comprising:
   code for causing the first wireless communication device to transmit, to the second wireless communication device, a report configuration indicating the training time period.

45. The non-transitory computer-readable medium of claim 41, further comprising:
   code for causing the first wireless communication device to receive, from the second wireless communication device, an instantaneous MPE violation report associated with the transmission of the first communication signal.

46. The non-transitory computer-readable medium of claim 45, further comprising:
   code for causing the first wireless communication device to determine a second configuration by adjusting at least one of at least one of a beam index, a transmission power parameter, or a resource allocation in the first configuration in response to the instantaneous MPE violation report;
   code for causing the first wireless communication device to transmit, to the second wireless communication device, the second configuration; and
   code for causing the first wireless communication device to receive, from the second wireless communication device, a second communication signal based on the second configuration.

47. The non-transitory computer-readable medium of claim 41, further comprising:
   code for causing the first wireless communication device to coordinate, with a third wireless communication device, to determine the first configuration based on the MPE profile associated with the second wireless communication device.

48. The non-transitory computer-readable medium of claim 47, wherein the code for causing the first wireless communication device to coordinate to determine the first configuration is further configured to:
   coordinate, with the third wireless communication device, to determine a network-level MPE profile associated with a plurality of wireless communication devices in a network, the plurality of wireless communication devices including the second wireless communication device; and
   coordinate, with the third wireless communication device, to handover the second wireless communication device from the first wireless communication device to the third wireless communication device based on the network-level MPE profile.

49. An apparatus comprising:
   means for transmitting, to a second wireless communication device, a plurality of reports, each report indicating an allowable transmission power level at the apparatus satisfying a maximum permissible exposure (MPE) parameter;
   means for receiving, from the second wireless communication device, a first configuration based on an MPE profile associated with the apparatus in response to the plurality of reports, wherein the MPE profile includes statistical information associated with at least the allowable transmission power levels; and
   means for transmitting, to the second wireless communication device, a first communication signal over a first beam based on the first configuration.

50. The apparatus of claim 49, wherein the means for transmitting the first communication signal is further configured to transmit the first communication signal over the first beam based at least on one of a beam index, a transmission power parameter, or a resource allocation in the first configuration.

51. The apparatus of claim 49, further comprising:
means for determining the allowable transmission power levels over a training time period,
wherein the MPE profile includes the statistical information associated with at least the allowable transmission power levels over the training time period.

52. The apparatus of claim 51, further comprising:
means for receiving, from the second wireless communication device, a report configuration indicating the training time period.

53. The apparatus of claim 49, further comprising:
means for determining whether the transmitting the first communication signal satisfies an instantaneous MPE parameter; and
means for transmitting, to the second wireless communication device, an instantaneous MPE violation report when determining that the transmitting the first communication signal does not satisfy the instantaneous MPE parameter.

54. The apparatus of claim 53, further comprising:
means for receiving, from the second wireless communication device, a second configuration in response to the instantaneous MPE violation report, the second configuration indicating at least one of an updated beam index, an updated transmission power parameter, or an updated resource allocation; and
means for transmitting a second communication signal based on the second configuration.

55. The apparatus of claim 49, further comprising:
means for transmitting, to a third wireless communication device, the plurality of reports,
wherein the second wireless communication device and the third wireless communication device are different.

56. The apparatus of claim 55, further comprising:
means for transmitting, to the third wireless communication device, a second communication signal over a second beam different from the first beam,
wherein the first configuration indicates an instruction to handover from the second wireless communication device to the third wireless communication device.

57. An apparatus comprising:
means for receiving, from a second wireless communication device, a plurality of reports, each report indicating an allowable transmission power level at the second wireless communication device satisfying a maximum permissible exposure (MPE) parameter;
means for transmitting, to the second wireless communication device, a first configuration based on an MPE profile associated with the second wireless communication device in response to the plurality of reports, wherein the MPE profile includes statistical information associated with at least the allowable transmission power levels; and
means for receiving, from the second wireless communication device, a first communication signal over a first beam based on the first configuration.

58. The apparatus of claim 57, further comprising:
means for determining the MPE profile associated with the second wireless communication device based at least on the plurality of reports; and
means for determining the first configuration including at least one of a beam index, a transmission power parameter, or a resource allocation based at least on the MPE profile.

59. The apparatus of claim 57, wherein the means for receiving the plurality of reports is further configured to receive the plurality of reports over a training time period, and wherein the apparatus further comprises:
means for determining the MPE profile including the statistical information associated with the allowable transmission power levels over the training time period.

60. The apparatus of claim 59, further comprising:
means for transmitting, to the second wireless communication device, a report configuration indicating the training time period.

61. The apparatus of claim 57, further comprising:
means for receiving, from the second wireless communication device, an instantaneous MPE violation report associated with the transmitting the first communication signal.

62. The apparatus of claim 61, further comprising:
means for determining a second configuration by adjusting at least one of at least one of a beam index, a transmission power parameter, or a resource allocation in the first configuration in response to the instantaneous MPE violation report;
means for transmitting, to the second wireless communication device, the second configuration; and
means for receiving, from the second wireless communication device, a second communication signal based on the second configuration.

63. The apparatus of claim 57, further comprising:
means for coordinating, with a third wireless communication device, to determine the first configuration based on the MPE profile associated with the second wireless communication device.

64. The apparatus of claim 63, wherein the means for coordinating to determine the first configuration is further configured to:
coordinate, with the third wireless communication device, to determine a network-level MPE profile associated with a plurality of wireless communication devices in a network, the plurality of wireless communication devices including the second wireless communication device; and
coordinate, with the third wireless communication device, to handover the second wireless communication device from the apparatus to the third wireless communication device based on the network-level MPE profile.

\* \* \* \* \*